United States Patent
Ohno et al.

(10) Patent No.: US 7,187,632 B2
(45) Date of Patent: Mar. 6, 2007

(54) OPTICAL DISK DEVICE AND METHOD OF ADJUSTING TILT CONTROL AMOUNT

(75) Inventors: Takehide Ohno, Kanagawa (JP); Yoshiaki Aota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 730 days.

(21) Appl. No.: 10/653,220

(22) Filed: Sep. 3, 2003

(65) Prior Publication Data

US 2004/0057353 A1 Mar. 25, 2004

(30) Foreign Application Priority Data

Sep. 19, 2002 (JP) .............................. 2002-274117
May 19, 2003 (JP) .............................. 2003-141204

(51) Int. Cl.
*G11B 7/00* (2006.01)
(52) U.S. Cl. ................................. 369/44.32; 369/53.19
(58) Field of Classification Search ............ 369/44.32, 369/44.36, 44.29, 53.19, 44.13, 44.33, 47.15, 369/47.17, 47.19, 53.31, 53.33, 53.12, 53.13, 369/53.14, 53.42, 53.29
See application file for complete search history.

(56) References Cited

U.S. PATENT DOCUMENTS

| 5,086,422 A | 2/1992 | Hagiya et al. |
| 5,128,806 A | 7/1992 | Ohno |
| 5,140,572 A | 8/1992 | Kibune et al. |
| 5,231,623 A | 7/1993 | Kanno et al. |
| 5,237,551 A | 8/1993 | Ogawa et al. |
| 5,303,089 A | 4/1994 | Ohno |
| 5,351,221 A | 9/1994 | Ohno |
| 5,506,828 A | 4/1996 | Kanno et al. |
| 5,777,960 A | 7/1998 | Ohno |
| 5,828,634 A | 10/1998 | Ohno et al. |
| 5,886,962 A * | 3/1999 | Takamine et al. ......... 369/44.32 |
| 6,526,007 B1 * | 2/2003 | Fujita ...................... 369/44.32 |
| 6,532,118 B2 | 3/2003 | Ohno |
| 7,046,593 B2 * | 5/2006 | Ito .......................... 369/44.32 |
| 2004/0257930 A1 * | 12/2004 | Ohno ....................... 369/44.32 |

FOREIGN PATENT DOCUMENTS

JP 03-037829 2/1991

* cited by examiner

*Primary Examiner*—Ali Neyzari
(74) *Attorney, Agent, or Firm*—Dickstein Shapiro LLP

(57) ABSTRACT

In a state in which an optical disk having a warping amount equal to or smaller than a predetermined amount is attached to a spindle motor, an output of tilt detection result is stored as a reference tilt value in a memory. At this time, a control signal corresponding to a driving inclining amount in which inclining the objective lens by the driving inclining amount minimizes the inclination of the objective lens from the attached optical disk is stored as a reference control value in the memory. An CPU a multiplies difference between a detection result of the tilt detection and the reference tilt value by a control constant, and adds the reference control value to the multiplied difference, and provides the thus-obtained control signal to a tilt driving circuit.

26 Claims, 13 Drawing Sheets

OPTICAL DISK DEVICE AND METHOD OF ADJUSTING TILT CONTROL AMOUNT

BACKGROUND OF THE INVENTION

1. Field of the Invention

The present invention relates to an optical disk device that writes information on an optical disk and reads information from the optical disk. Further, the present invention relates to a method of adjusting the optical disk device. Particularly, the present invention relates to an optical disk device that can perform accurate tilt adjustment without being affected by an error, and to a method of adjusting the optical disk device.

2. Description of the Related Art

An objective lens focuses laser light to form a light spot on a track of an optical disk in order to perform recording or reproducing. When the optical axis of the objective lens is inclined with respect to the recording surface of the optical disk, optical aberration is generated on the light spot, and as a result, a recording or reproducing problem occurs. For this reason, the inclination of the objective lens with respect to the recording surface of the optical disk has to be as small as possible.

Recently, DVD for reproducing has become widely used, and DVD for recording has been in practical use. Further, the numerical aperture of the objective lens needs to be increased in order to achieve high density recording. Accordingly, it is more required to prevent the objective lens from being inclined from the recording surface of the optical disk.

In an effort to resolve the above problem, Japanese Patent No. 2747332 discloses a technique in which a sensor for detecting the tilt of an optical disk is provided at a part that fixes an optical pickup, and the objective lens holder is deformed by a piezoelectric element in accordance with the detection amount of the sensor so that the objective lens can be made to be inclined for adjustment. In this manner, the inclination of the objective lens from the optical disk can be adjusted.

Since the objective lens and the sensor are separately provided in this case, when the objective lens is inclined to adjust the tilt, the sensor is not moved. Accordingly, the tilt value that the sensor detected does not become zero. The tilt is determined by the detection amount and the sensitivity of the sensor. Inclination control is performed such that the voltage necessary for adjusting the determined disk tilt is applied to the piezoelectric element based on the sensitivity of the objective lens inclination adjustment performed by the piezoelectric element.

However, in the tilt adjustment system (that is not limited to the system using the piezoelectric element) in which the objective lens is not inclined together with the sensor, a tilt adjustment error is caused by a zero point and sensitivity of the sensor, and a zero point and a sensitivity scattering of mechanisms for inclining the objective lens.

For this reason, it is necessary to accurately adjust the position of the sensor, and the position of the mechanism for inclining the objective lens, but an adjustment discrepancy is generated due to the adjustment difference and the circuit offset. Furthermore, the sensitivity scattering of the mechanisms that incline the sensor and the objective lens has to be suppressed as much as possible, but the extent of limitation of such suppression is limited because of the material difference and the gain difference of a detection circuit and a driving circuit.

In addition, when the sensitivity changes as time lapses, the tilt adjustment error increases. Accordingly, in the system in which the objective lens is not inclined together with the sensor, the tilt adjustment cannot be performed adequately.

SUMMARY OF THE INVENTION

It is an object of the present invention to provide an optical disk device that can perform accurate tilt adjustment without being affected by zero point deviance and sensitivity scattering (fluctuation) of tilt detection means, zero point deviance and sensitivity scattering of objective lens inclining means, offset and gain scattering of a circuit, and a change of them.

It is another object of the present invention to provide a method of adjusting a tilt control amount in which accurate tilt adjustment can be performed without being affected by zero point deviance and sensitivity scattering of tilt detection means, zero point deviance and sensitivity scattering of objective lens inclining means, offset and gain scattering of a circuit, and a change of them.

According to one aspect of the present invention, there is provided an optical disk device comprising:

an optical pickup that records information on an optical disk or reproduces information from the optical disk, the optical disk being attached to the optical disk device;

a tilt sensor that is provided on the optical pickup and detects inclination of the optical disk in terms of a radial direction of the optical disk;

a tilt detection circuit that detects an output of the tilt sensor;

an objective lens that is provided on the optical pickup and focuses laser light on the optical disk;

tilt driving means for inclining the objective lens in terms of the radial direction by an amount corresponding to a driving signal;

a tilt driving circuit that applies the driving signal to the tilt driving means based on a control signal;

tilt control means for providing the control signal to the tilt driving circuit based on an output of the tilt detection circuit;

reference tilt value storing means for storing a reference output of the tilt detection circuit as a reference tilt value, the reference output of the tilt detection circuit being based on a reference optical disk having a warping amount equal to or smaller than a predetermined value;

reference control value storing means for storing as a reference control value a reference control signal corresponding to a reference driving inclining amount in which inclining the objective lens by the reference driving inclining amount minimize or reduces inclination of the objective lens relative to the reference optical disk;

reference control value storing means for storing as a reference control value a control signal corresponding to a driving inclining amount in which inclining the objective lens by the driving inclining amount minimizes or reduces, inclination of the objective lens from the reference optical disk, wherein the control signal is determined by multiplying a difference between the output of the tilt detection circuit and the reference tilt value by a predetermined control constant, and adding the reference control value to the multiplied difference.

With this optical disk device, it is possible to easily perform tilt adjustment without being affected by the zero point of the tilt detection means, the zero point of the objective lens inclining means, and the offset of the circuit.

According to another aspect of the present invention, the optical disk device further comprises:

adjustment tilt value storing means for storing as a second reference tilt value a second reference output of the tilt detection circuit being based on a second reference optical disk having a warping amount larger than the predetermined amount; and adjustment control value storing means for storing as a second reference control value a second reference control signal corresponding to the second reference driving inclining amount in which inclining the objective lens by the second reference driving inclining amount minimizes or reduces inclination of the objective lens relative to the second reference optical disk, wherein the predetermined control constant is determined on based on a difference between the second reference tilt value and the reference tilt value, and a difference between the second reference control value and the reference control value.

With this optical disk device, it is possible to perform accurate tilt adjustment without being affected by the scattering in the sensitivity of the tilt detection means, the sensitivity of the objective lens inclining means, and the circuit gain.

According to another aspect of the present invention, if the output of the tilt detection circuit is larger than a predetermined value when attaching the optical disk, the output of the tilt detection circuit is stored as a new second reference tilt value in the adjustment tilt value storing means, the adjustment control value storing means store as a new second reference control value a new second reference control signal corresponding to a new second reference driving inclining amount in which inclining the objective lens by the new second reference driving inclining amount minimizes or reduces inclination of the objective lens relative to the optical disk.

With this optical disk device, even if the sensitivity changes as the time lapses, it is possible to adjust the sensitivity change.

Other objects, features, and advantages of the present invention will become more apparent from the following detailed description when read in conjunction with the accompanying drawings.

DETAILED DESCRIPTION OF PREFEERED EMBODIMENTS

A first preferred embodiment of the present invention will be described in the following.

Figure 1:
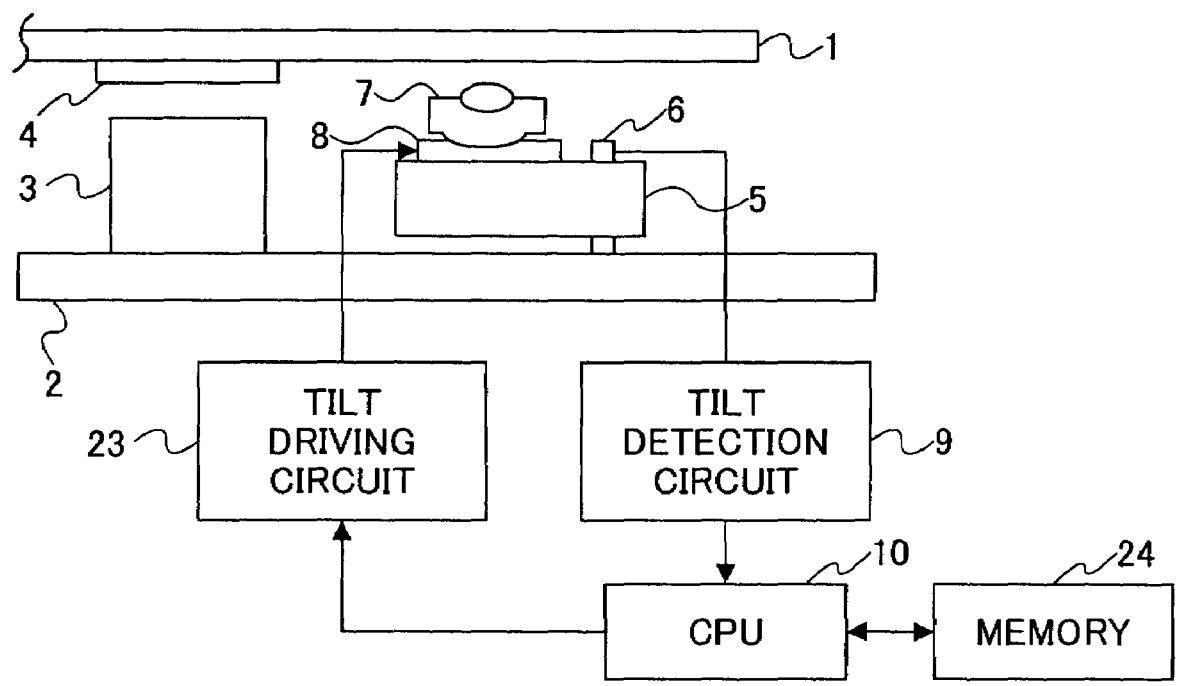
FIG. 1 shows the configuration of an optical disk device according to a first preferred embodiment of the present invention.

FIG. 1 shows the configuration of an optical disk device according to the first embodiment of the present invention. In this embodiment, the optical disk device includes a chassis 2, a spindle motor 3, a turning table 4, an optical pickup 5, a tilt sensor 6, an objective lens actuator 7, a tilt adjustment mechanism 8, a tilt detection circuit 9, a CPU 10, a tilt driving circuit 23, and a memory 24.

An optical disk 1 is attached on the turning table 4 of the spindle motor 3 fixed on the chassis 2, and is rotated in this attached state. The optical pickup 5 is supported by the chassis 2 such that the optical pickup 5 is directed in the radial direction of the optical disk 1. The tilt sensor 6 is provided at the optical pickup 5. The objective lens actuator 7 is attached to the optical pickup 5 via the tilt adjustment mechanism 8 that mechanically inclines the objective lens actuator 7.

The tilt sensor 6 includes a light emitting element and two divided light receiving elements so that the light emitting element can emit light to the optical disk, and the light receiving elements can receive this light reflected by the optical disk. The received signals of the two divided light receiving elements are amplified by the detection circuit 9, and the calculation result of the difference between the two received signals are sent to the CPU 10.

Figure 2:
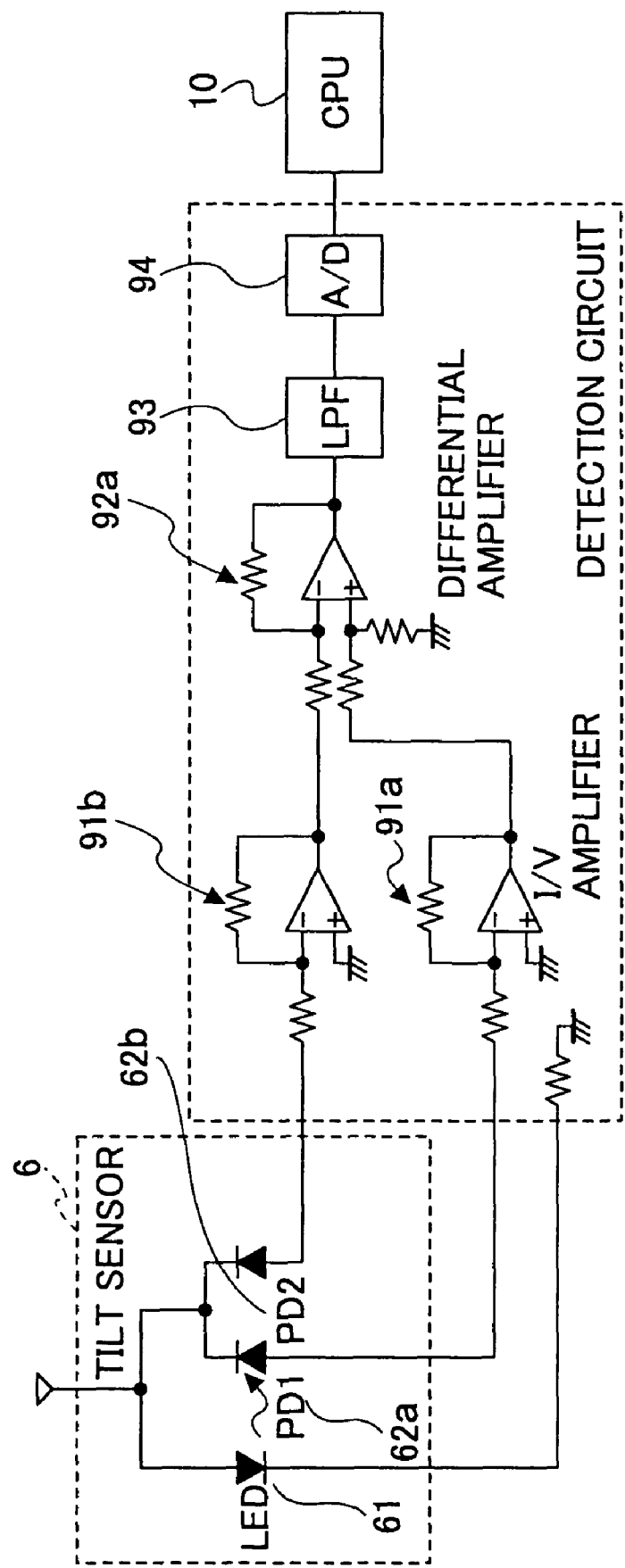
FIG. 2 shows the configuration of a tilt detection unit of the optical disk device of FIG. 1.

FIG. 2 shows the detailed configuration of a tilt detection unit of the optical disk device according to the first embodiment. The tilt detection unit includes the tilt sensor 6, the tilt detection circuit 9, and the CPU 10.

The light generated from a light emitting diode (LED) 61 is reflected by the optical disk 1, and then, enters two divided photo diodes (PD) 62a and 62b. Electric currents are output from the terminals of the photo diodes 62a and 62b in accordance with the incident light amount, and are converted into voltages by I/V amplifiers 91a and 91b. Thereafter, by means of a differential amplifier 92a, the converted voltages are made to become a voltage that is proportional to the difference between the light amounts detected by the two divided photo diodes 62a and 62b, respectively. A low-pass filter 93 performs component cutting on this voltage that is proportional to the light amount difference so as to cut the voltage component that is larger than a rotational frequency caused by the runout of the optical disk 1. The output of the low-pass filter 93 is input to an A/D converter 94 where the output of the low-pass filter 93 is converted into a digital value. Then, the digital value output from the A/D converter 94 is input to the CPU 10 as the tilt detection result.

Figure 3A:
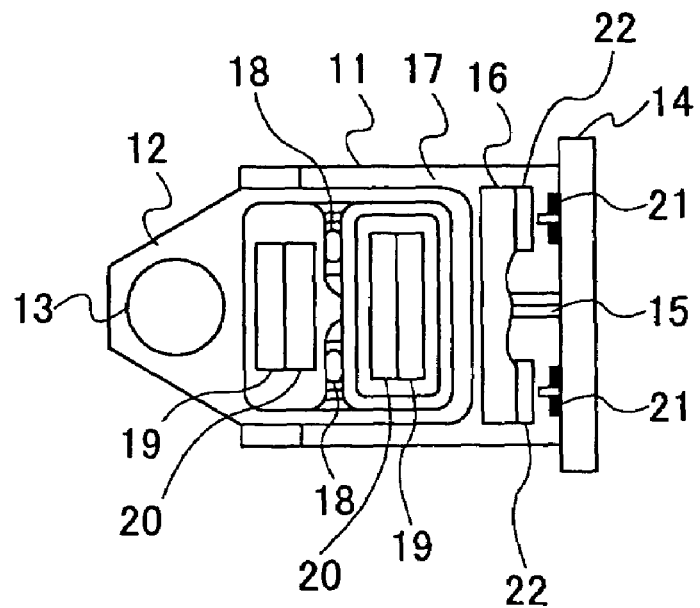
FIG. 3A is an illustration for an mechanical operation at the time of the tilt adjustment of the optical disk device of FIG. 1.
Figure 3B:
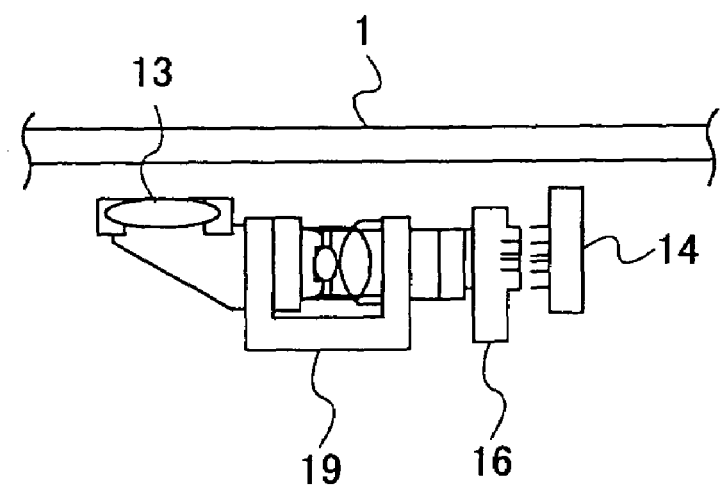
FIG. 3B is a side view of FIG. 3A.

As shown in FIGS. 3A and 3B, a movable unit 12 is supported by a supporting wire 11, for example, so as to be movable in a focusing and tracking direction. The objective lens 13 is fixed on the movable unit 12. A supporting wire fixing unit 14 that fixes the supporting wire 11 is supported by a torsion spring 15 such that the fixing unit can rotate and move relative to a fixing unit 16. A focusing coil 17 and a tracking coil 18 are fixed on the movable unit 12. The movable unit 12 is driven in the focusing and tracking direction by a magnetic field produced by a permanent magnet fixed on a yoke 19, and by electric currents that flow through the focusing coil 17 and the tracking coil 18.

A tilt coil 21 is fixed on the supporting wire fixing unit 14, and the permanent magnet 22 is fixed on the fixing unit 16 at the position facing the tilt coil 21. The CPU 10 provides a command to a tilt driving circuit 23 so that the tilt driving circuit 23 causes an electric current to flow through the tilt coil 21. In this manner, the electric current that flows through the tilt coil 21 can cause the supporting wire fixing unit 14 to rotate to perform the tilt adjustment.

Figure 4:
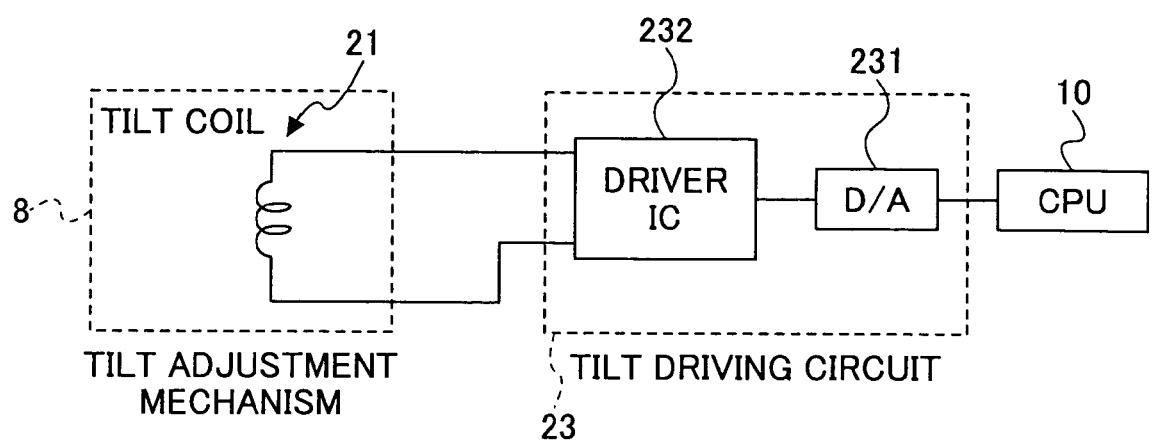
FIG. 4 shows the configuration of a tilt driving unit of the optical disk device of FIG. 1.

FIG. 4 shows the configuration of a tilt driving unit in the optical disk device according to the first embodiment of the present invention. The tilt driving unit includes the tilt adjustment mechanism 8, the CPU 10, and the tilt driving circuit 23.

The CPU 10 outputs a tilt driving signal based on the tilt detection result. This tilt driving signal is input to a D/A converter 231 where D/A conversion is performed on the input tilt driving signal. The tilt driving signal converted into an analog signal by the D/A converter is then input to a driver IC 232. Based on this input analog tilt driving signal, the driver IC 232 provides a voltage to the tilt coil 21 to perform the tilt driving.

Figure 5:
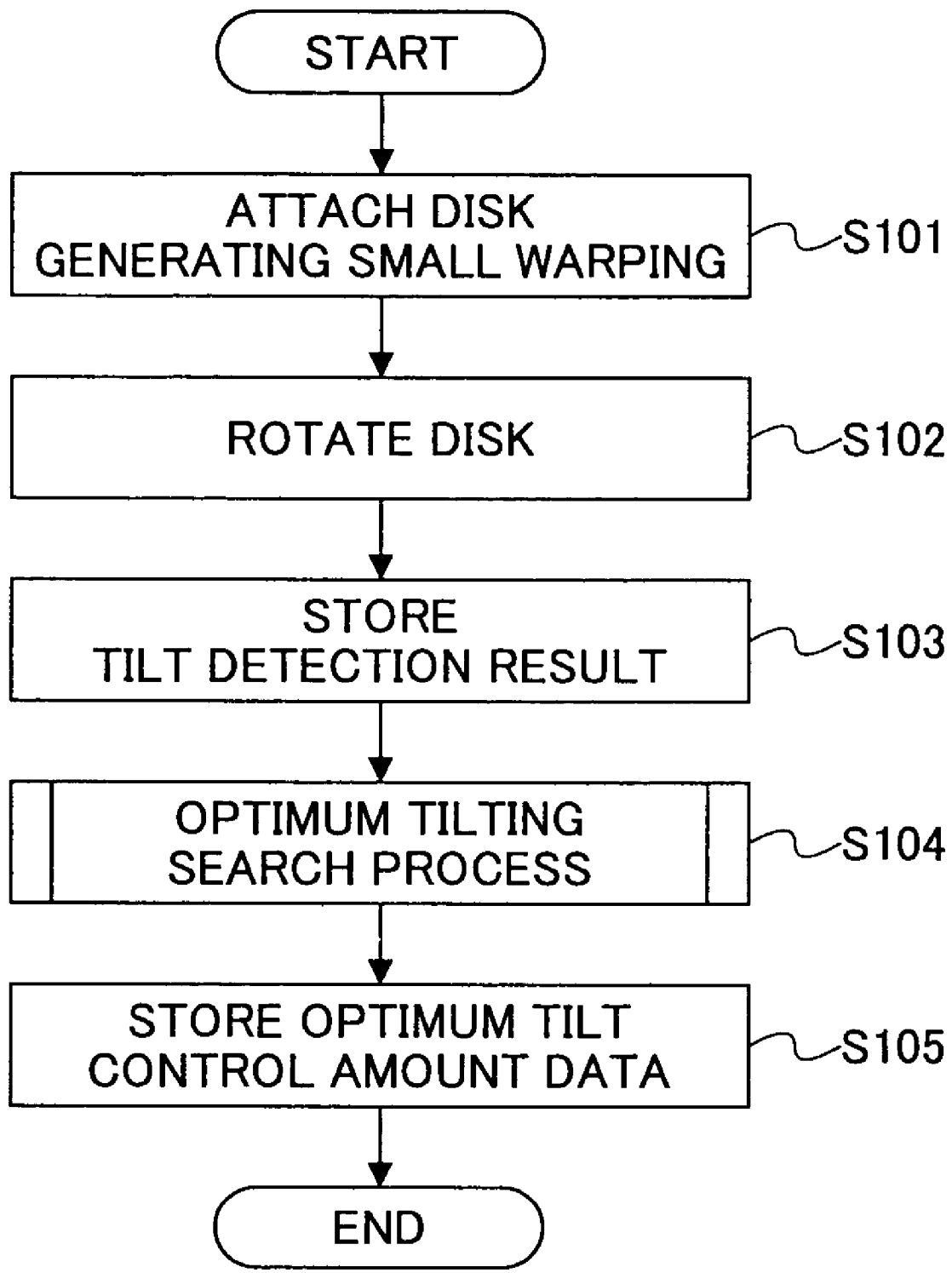
FIG. 5 is a flowchart showing the flow of tilt adjustment processes.

FIG. 5 shows a process flow of a method of adjusting the optical disk device according to the first embodiment of the present invention. At Step S101, an optical disk whose warping amount is equal to or less than a predetermined amount C is attached to the spindle motor. The term "the optical disk whose warping amount is equal to or less than a predetermined amount C" refers to, for example, a flat optical disk made of glass that generates small negligible runout and warping. In one example, the predetermined amount C is 0.3 degree (unit for an angle) with respect to a radial direction of the optical disk or other suitable tilt amount larger than 0.3 degree with respect to a radial direction of the optical disk. It is preferable that the tilt amount caused by the runout and/or the warping is as small as possible. Particularly, it is preferable that the tilt amount is equal to or smaller than 0.05 degree. At Step S102, the optical disk 1 is rotated by the spindle motor 3. When the optical disk 1 is rotated, the tilt is detected, and the tilt detection result (the digital value converted from the analog value) is stored as a reference tilt value in the memory 24 at Step S103. The reference tilt value represents a reference value that takes into consideration both a position adjustment error of the tilt sensor 6 and an offset of the tilt detection circuit 9. Next, an optimum tilting search process is performed to determine an optimum amount at Step S104 (in which inclining the objective lens by this optimum amount minimizes, or at least reduces, inclination of the objective lens relative to this optical disk whose warping amount is equal to or smaller than the predetermined amount C). This determined control amount (the optimum amount that is the value before D/A conversion is performed) is stored as a reference control value in the memory 24 at Step S105.

Figure 6:
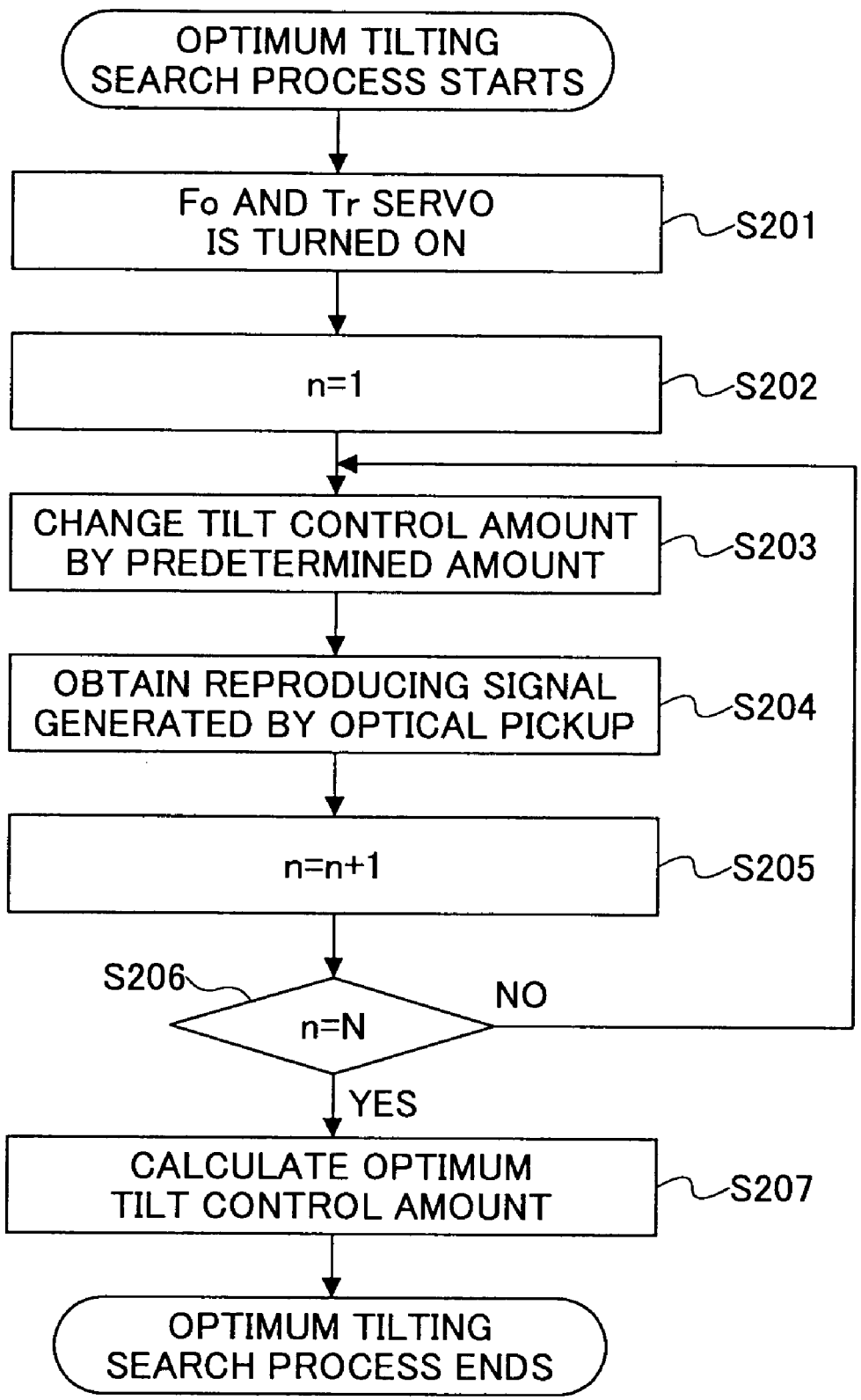
FIG. 6 is a flowchart showing the flow of the optimum tilting search process.

Next, the flow of an exemplary optimum tilting search process will be described with reference to FIGS. 6 and 7. FIG. 6 shows the flow of the optimum tilting search process.

At Step S201, a servo of the optical pickup 5 is turned ON on the track of the optical disk 1 whose warping is equal to or smaller than the predetermined amount C. Then, the process for the first time ("n"=1: "n" designates the number of times of the performed processes) is started at Step S202, and the tilt control amount (tilt control value) is changed by a predetermined amount at Step S203. Further, at Step S204, a reproducing signal level of the optical pickup 5 is measured, and comparison data between the predetermined tilt control amount and the reproducing signal level is obtained. One example of the reproducing signal level of the optical pickup 5 may be an amplitude of an information reproducing signal.

Figure 7:
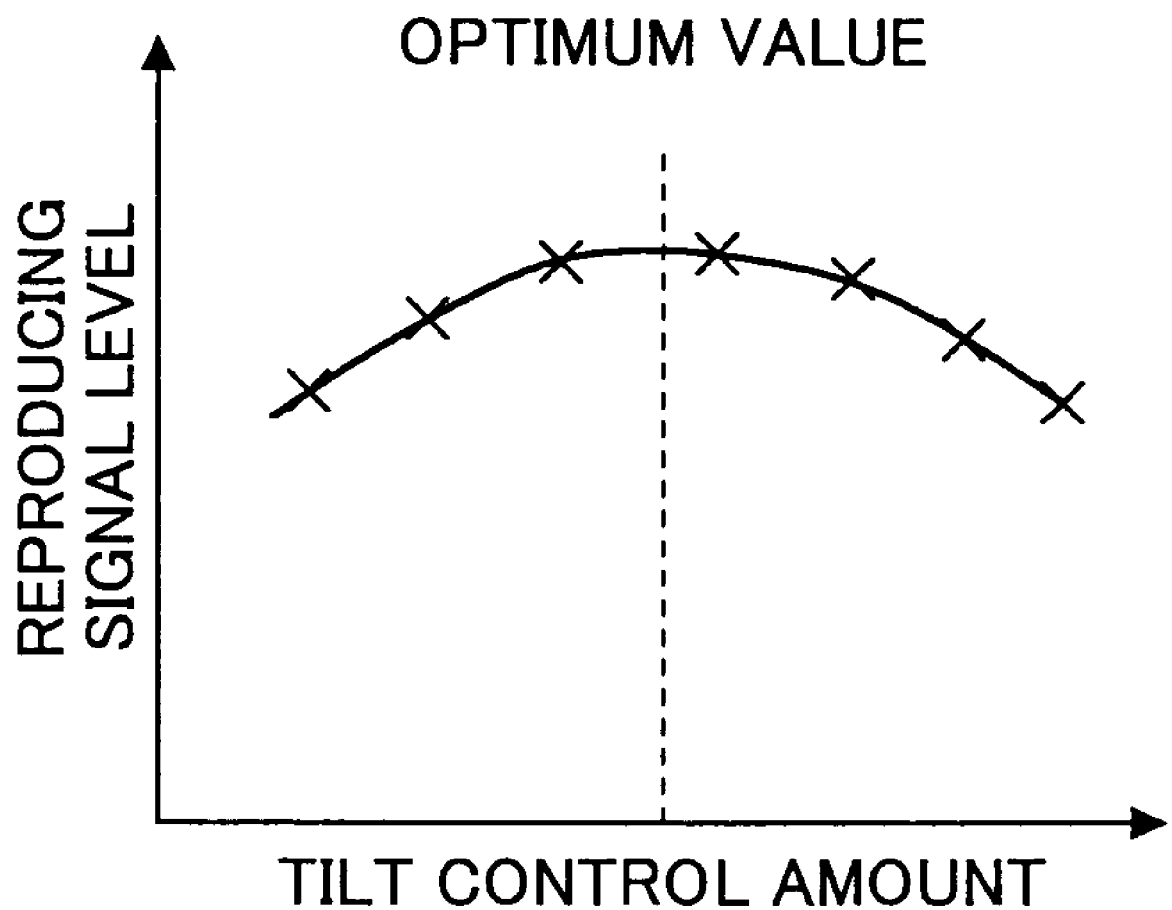
FIG. 7 shows the relation between a tilt control amount and a reproducing signal level.

The comparison data between the tilt control amount and the reproducing signal level is shown in FIG. 7. The CPU 10 generates an approximate quadratic curve based on the comparison data, and determines the tilt control amount that corresponds to the highest signal level. This tilt control amount corresponding to the highest signal level is determined as the optimum tilt control amount.

The number "N" of data points may be, for example, 3 to 8 will depend on the desired accuracy of the quadratic curve approximation and time for obtaining data. Furthermore, a track error signal amplitude generated at the time of traversing the track with the servo for only the focusing being turned ON may be used as the reproducing signal level.

After the reproducing signal of the optical pickup is obtained, the value "1" is added to the value of the number "n" at Step S205, and the value of the number "n" is compared with the value of the data number "N" at Step 206. When "the value "n" is smaller than the value "N" (No in Step S206), the procedure returns to Step S203, and the above-described processes are repeated until the value "n" becomes equal to the value "N" while the tilt control amount is changed within a predetermined range.

When the value "n" becomes equal to the value "N" (Yes in Step S206), the quadratic curve approximation is performed based on the obtained "N" number of data to calculate as the optimum tilting control amount the tilt control amount at which the signal level becomes highest. This optimum tilting amount is set as a reference control value that will be used for the subsequent tilt control.

The aforementioned reference tilt value X0 and reference control value Y0 is obtained by using the optical disk whose warping is equal to or smaller than the predetermined amount C. In the following, X designates a tilt value obtained by attaching an optical disk that may be different from the optical disk used for obtaining X0 and Y0. (In claims, the optical disk having warping amount equal to or larger than the predetermined amount may be called a reference optical disk, and the optical disk different from the reference optical disk may be called an object optical disk.)

Assuming that the tilt value detected by the tilt detection circuit 9 is X, the value X includes the position adjustment error of the tilt sensor 6 and the offset of the tilt detection circuit 9. For this reason, the CPU 10 subtracts the reference tilt value X0 from the value X. This reference tilt value X0 is obtained in the above-described manner by using the optical disk whose warping amount is equal to or smaller than a predetermined value. This value X−X0 is multiplied by a ratio k of the tilt detection sensitivity to obtain a value Y=k×(X−X0). This obtained value Y=k×(X−X0) may be set as the control amount. However, when this value Y=k×(X−X0) is used as it is, the objective lens 13 is inclined to the position that is displaced from an appropriate position by an angle corresponding to an adjustment error displacement of a neutral position of the tilt adjustment mechanism 8 and a offset of the tilt driving circuit 23. Accordingly, the reference control value Y0 is added to Y=k×(X−X0) to output the value Y=k×(X−X0)+Y0 as a control signal from the CPU 10. This reference control value Y0 is obtained in the above-described manner by using the optical disk whose warping amount is equal to or smaller than a predetermined value.

Accordingly, with the above-described first embodiment, the accurate tilt adjustment can be performed without being affected by the position adjustment error of the tilt sensor 6, the offset of the tilt detection circuit 9, the neutral position displacement of the tilt adjustment mechanism 8, and the offset of the tilt driving circuit 23.

Next, a second preferred embodiment of the present invention will be described. In the second embodiment, the configuration of the optical disk device is the same as that of the first embodiment.

According to the second embodiment, after the same tilt adjustment as in the first embodiment is performed, the further adjustment is performed for the tilt detection sensitivity and tilt driving sensitivity.

Figure 8:
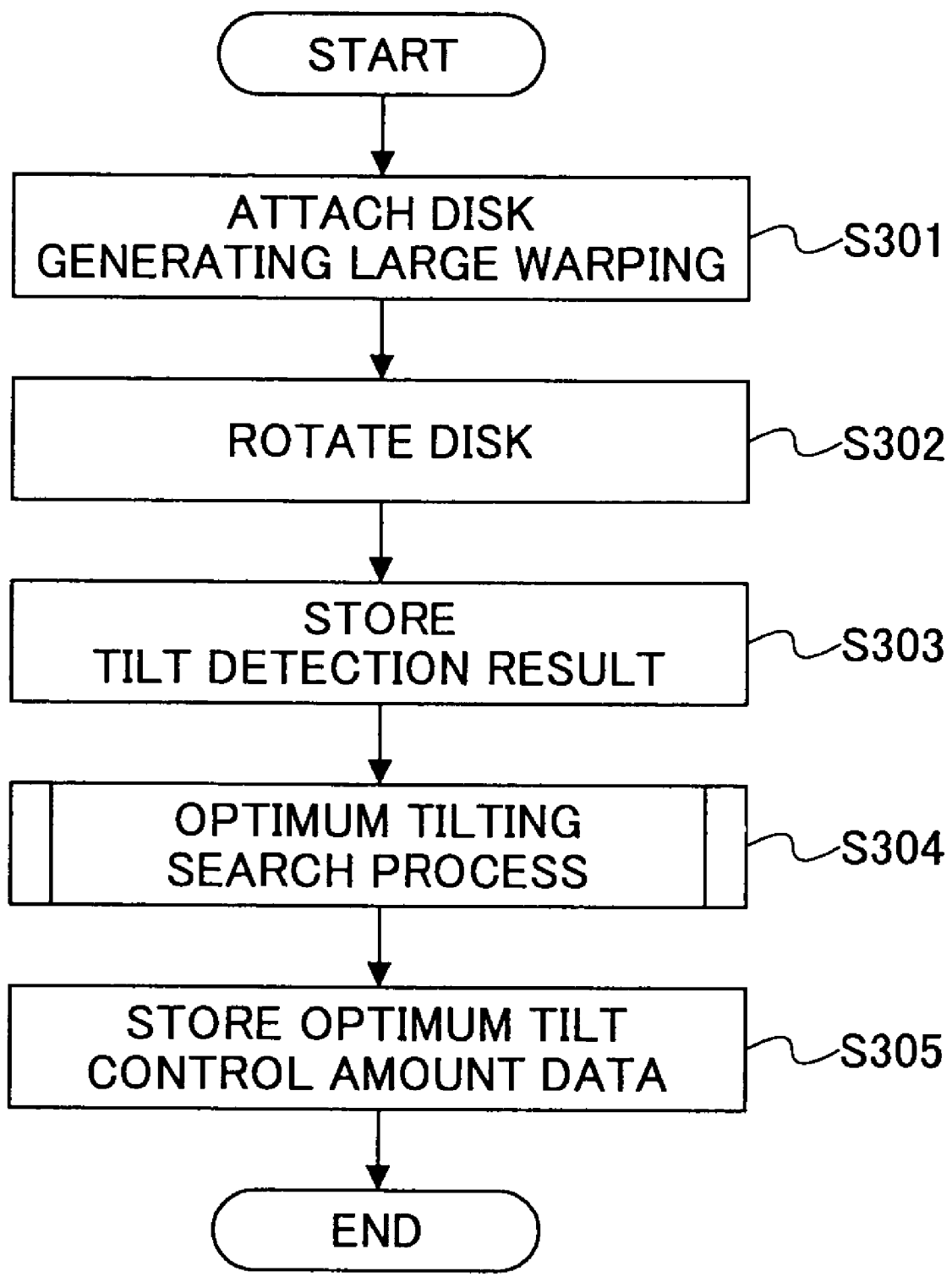
FIG. 8 is a flowchart showing the flow of the operation performed when a tilt detection sensitivity and a tilt driving sensitivity are adjusted.

FIG. 8 shows the flow of the operation for adjusting the tilt detection sensitivity and the tilt driving sensitivity. This operation is performed following the processes shown in FIG. 5.

First, at Step S301, the optical disk 1 whose warping generated at the time of being attached to the spindle motor is larger than the predetermined amount C is attached to the spindle motor, and at Step S302, the attached optical disk 1 is rotated. At this time, when the warping of the attached optical disk 1 is too large, the focusing servo and the tracking servo would not be appropriately performed. On the other hand, when the warping of the optical disk 1 is small, the adjustment error becomes large. Accordingly, a preferable tilt amount approximately ranges from 0.3 to 0.5 degree, and particularly may not include 0.3 degree. Subsequently, a tilt amount is detected, and the detected tilt value is stored as a tilt value A in the memory 24 at Step S303.

The tilt value A includes an error caused by the sensitivity scattering of the tilt sensor 6 and the gain scattering of the tilt detection circuit 9.

Furthermore, in the same manner as shown in FIGS. 6 and 7 of the first embodiment, at Step S304, the optimum tilt control amount is obtained with the optical pickup being at the position in the radial direction of the optical disk 1 at which the tilt value A was obtained. At Step S305, the obtained optimum tilt control amount is stored as a control value B in the memory 24. The control value B is the value including an error caused by the sensitivity scattering of the tilt adjustment mechanism 8 and the gain scattering of the tilt driving circuit 23.

Based on the reference tilt value X0, the tilt value A, the reference control value Y0, and the control value B obtained in the above-described manner, the ratio between the tilt detection sensitivity and the tilt driving sensitivity is determined by the equation:

$$k'=(B-Y0)/(A-X0).$$

This value k' is obtained by using the actual sensitivity of the tilt sensor 6, the actual gain of the tilt detection circuit 9, the actual sensitivity of the tilt adjustment mechanism 8, and the actual gain of the tilt driving circuit 23. As a result, by using the value k', it is not necessary to consider the scattering error. In this case, instead of the equation Y=k×(X−X0)+Y0 shown in the first embodiment, Y=k'×(X−X0)+Y0 can be used as the control amount.

Since the value k' is determined as the ratio, if the absolute value of the warping of the optical disk 1 used for the adjustment includes an error, this error becomes allowable. Accordingly, it is easy to manage the optical disk used for the adjustment.

After that, by using the information for the optimum tilt control amount stored in the memory 24, the CPU 10 performs the tilt adjustment operation at the time of actual recording or reproducing for the optical disk 1 in the same manner as in the first embodiment.

Accordingly, with the second embodiment, the accurate tilt adjustment can be performed without being affected by the scattering in the sensitivity of the tilt sensor 6, the gain of the tilt detection circuit 9, the sensitivity of the tilt adjustment mechanism 8, and the gain of the tilt driving circuit 23.

A preferred third embodiment of the present invention will be described. In the third embodiment, the configuration of the optical disk device is the same as in the first embodiment.

Figure 9:
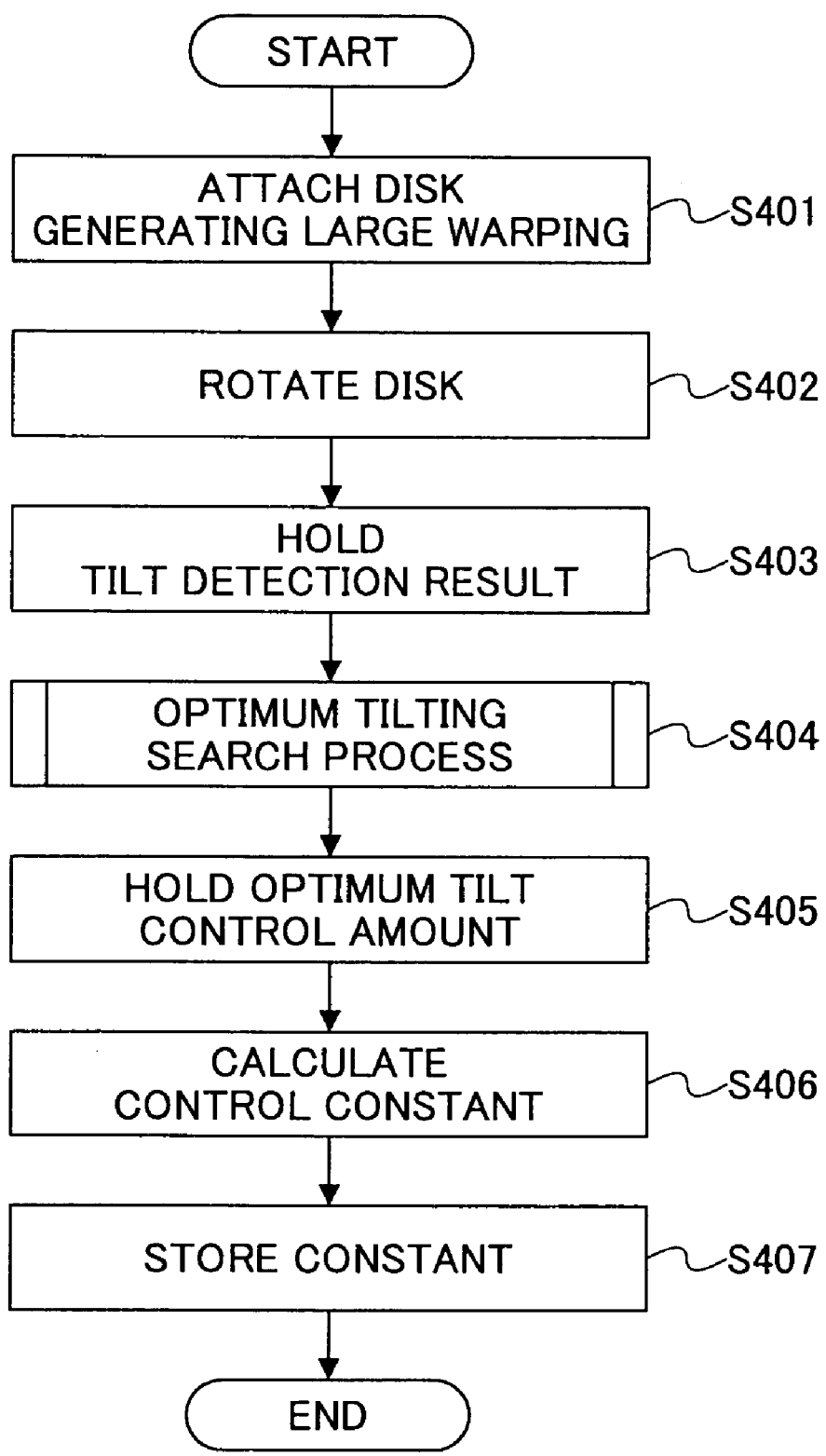
FIG. 9 is a flowchart showing the flow of the operation for storing values calculated based on the tilt amount and the control value.

According to the third embodiment, the tilt amount A and the control value B of the optical disk whose warping is larger than the predetermined amount C are not stored as they are, but the calculated value k' is stored in the memory 24. FIG. 9 shows the flow of this operation. The processes in Steps S401 to S404 are the same as the processes in Steps S301 to S304 of the optical disk device shown in FIG. 8 in the second embodiment.

According to the third embodiment, after the optimum tilting search process is performed in Step S404, the tilt value A and the control value B are held without being stored in the memory 24. Thereafter, the constant k' for the tilt control is calculated at Step S406, and the value k' is stored in the memory 24 at Step S407.

In this manner, by storing the value k', it becomes sufficient that the CPU 10 performs the operation once at the time of the adjustment for obtaining the value k', so that the work load and the time for the operation can be decreased, and the use amount of the memory 24 can be saved.

Next, a fourth preferred embodiment will be described. The configuration of the optical disk device is the same as in the first embodiment.

Figure 10:
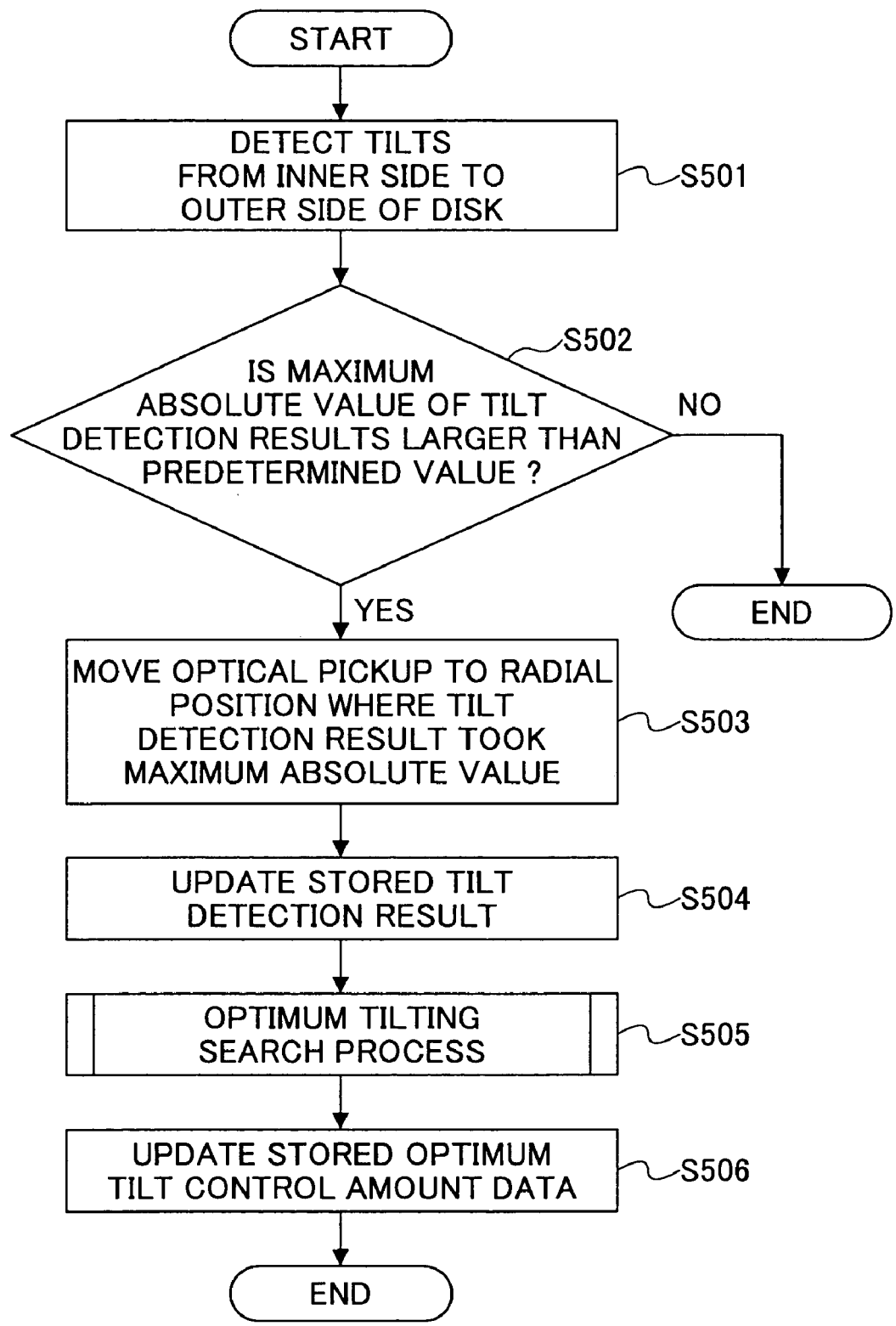
FIG. 10 is a flowchart showing a process of adjusting a sensitivity changed by the time lapse.

According to the fourth embodiment, the process of canceling the sensitivity change that occurs as the time lapses is performed in the optical disk device adjusted in the processes in the second or third embodiment. FIG. 10 shows the flow of the processes.

When the optical disk is attached to the spindle motor, the tilt amounts are detected at the positions from the inner side to the outer side of the optical disk 1 at Step S501. When the absolute vale of the maximum detected tilt amount is larger than a predetermined amount C (Yes in Step S502), the optical pickup 5 is moved to the radial position at which the value of the tilt detection result became highest at Step S503. Then, the value k' calculated as in the above-described manner is updated at Steps S504 to S506.

On the other hand, when the maximum absolute value of the tilt detection result is equal to or smaller than the predetermined value C (No in Step S502), the procedure proceeds to the normal recording or reproducing.

It is possible that the small predetermined value C leads to an opposite effect, so that the tilt amount is set to be a value larger than 0.3 degree as described above. The optical pickup 5 is moved to the radial position at which the tilt amount took the maximum absolute value, and the tilt value A and the control value B are determined to calculate the constant k'.

FIG. 10 shows an example in which the tilt value A and the control value B stored in the memory 24 are updated to be new values. However, alternatively, the value k' stored in the memory 24 may be updated as in the third embodiment.

Thus, according to the fourth embodiment, even if the sensitivity changes as the time lapses, the value k' is determined from the changed sensitivity, so that the accurate tilt adjustment can be performed.

Next, a fifth preferred embodiment of the present invention will be described. In the fifth embodiment, the configuration of the optical disk device is the same as in the first embodiment.

Figure 11:
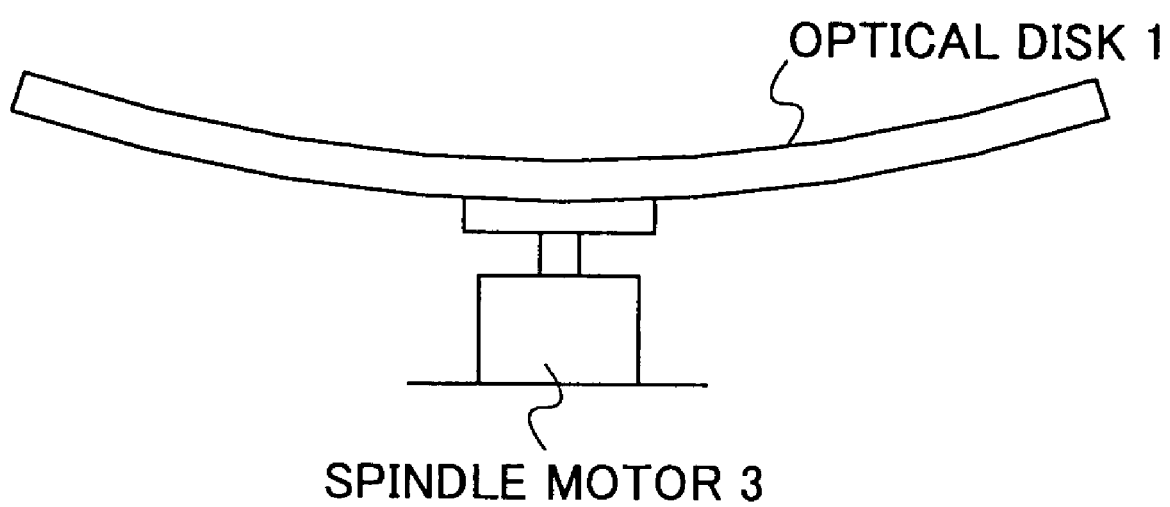
FIG. 11 shows an optical disk in which a warping changes from the inner side to the outer side of an optical disk.

According to the fifth embodiment, the tilt adjustment is performed by using one optical disk for the adjustment. In the fifth embodiment, as shown in FIG. 11, the adjustment is performed by using the optical disk in which the warping amount of the optical disk changes from the inner side to the outer side of the optical disk 1. As shown in FIG. 11, the tilt amount caused by the warping of the optical disk gradually increases from the inner side to the outer side in terms of a radial position of the optical disk.

Preferably, the tilt amount at the inner side of the optical disk is 0 degree, and the tilt amount at the outer side of the optical disk is approximately 0.3 to 0.5 degree.

Figure 12:
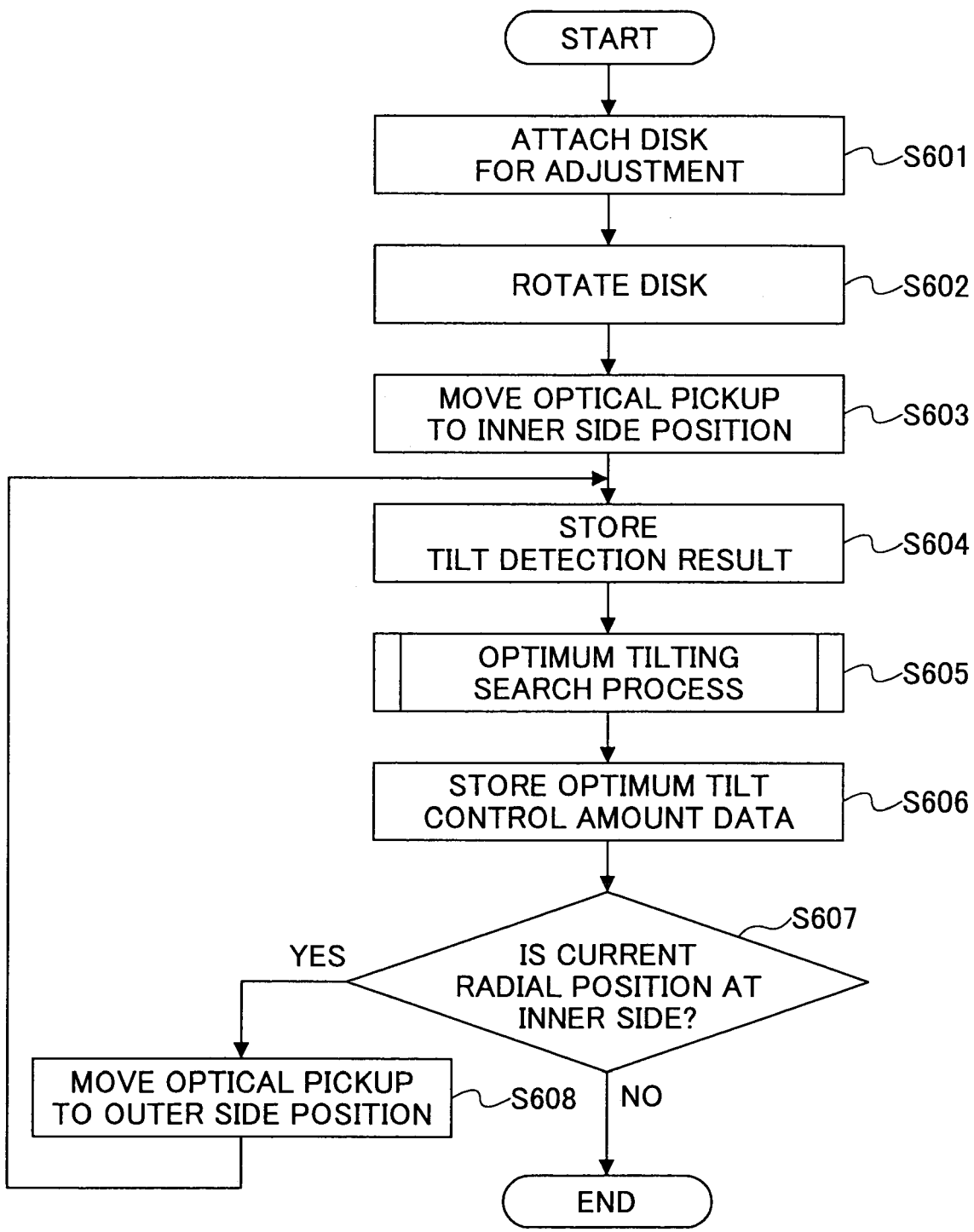
FIG. 12 is a flowchart showing an adjustment process in the case tilt adjustment is performed by using an optical disk in which the warping changes from the inner side to the outer side of the optical disk.

FIG. 12 shows the flow of an adjustment method. First, at Step S601, the optical disk for the adjustment is attached, and at Step S602, the attached optical disk 1 is rotated. Next, the optical pickup 5 is moved to the inner side at Step S603, and the tilt detection amount is stored as the tilt value A in the memory 24 at Step S604. The CPU 10 then performs an optimum tilting search process at Step S605, and stores the optimum tilt control amount as the control value B in the memory 24 at Step S606.

At this time, the optical pickup 5 is positioned at the inner side of the optical disk 1 (Yes in Step S608). Accordingly, the optical pickup 5 is then moved to the outer side of the optical disk 1 where the tilt caused by the warping is large at Step S608, and the procedure proceeds to Step S604. Thereafter, as in the above-described manner, a tilt value A2 and a control value B2 are obtained, and stored in the memory 24 (at Steps S604 to S606). At this time, since the optical pickup 5 is positioned at the outer side of the optical disk (No in Step S607), the process is terminated after the tilt value A2 and the control value B2 are stored in the memory 24.

The tilt detection value X has the linear relation with the tilt control value Y, so that it is possible to establish the following equation:

$$Y-B1=\{(B2-B1)/(A2-A1)\}\times(X-A1).$$

This equation is arranged to the equation (1):

$$Y=k''\times X+X0' \quad (1),$$

where $k''=(B2-B1)/(A2-A1)$, and $X0'=(-A1\times B2+A2\times B1)/(A2-A1)$

Accordingly, the control amount Y can be calculated from the tilt detection value by using the equation (1) at the time of the actual recording or reproducing.

In this manner, according to the fifth embodiment, the accurate tilt adjustment can be performed without being affected by the scattering of the position error and the sensitivity of the tilt sensor 6, the scattering of the adjustment error and the sensitivity of the tilt adjustment mechanism 8, and the scattering of the offset and the gain of the tilt driving circuit 23.

According to the fifth embodiment, different from the second to fourth embodiments, it is not necessary to prepare two optical disks, and the tilt adjustment can be performed by using one optical disk. Furthermore, in the fifth embodiment, the values A1, A2, B1 and B2 are stored in the memory 24. However, alternatively, the calculated values k'' and X0' may be stored in the memory 24. In this manner, it is sufficient to perform the above-described operation once, and the memory resource can be saved.

Next, a sixth embodiment of the present invention will be described. In the sixth embodiment, the configuration of the optical disk device is the same as in the first embodiment.

Figure 13:
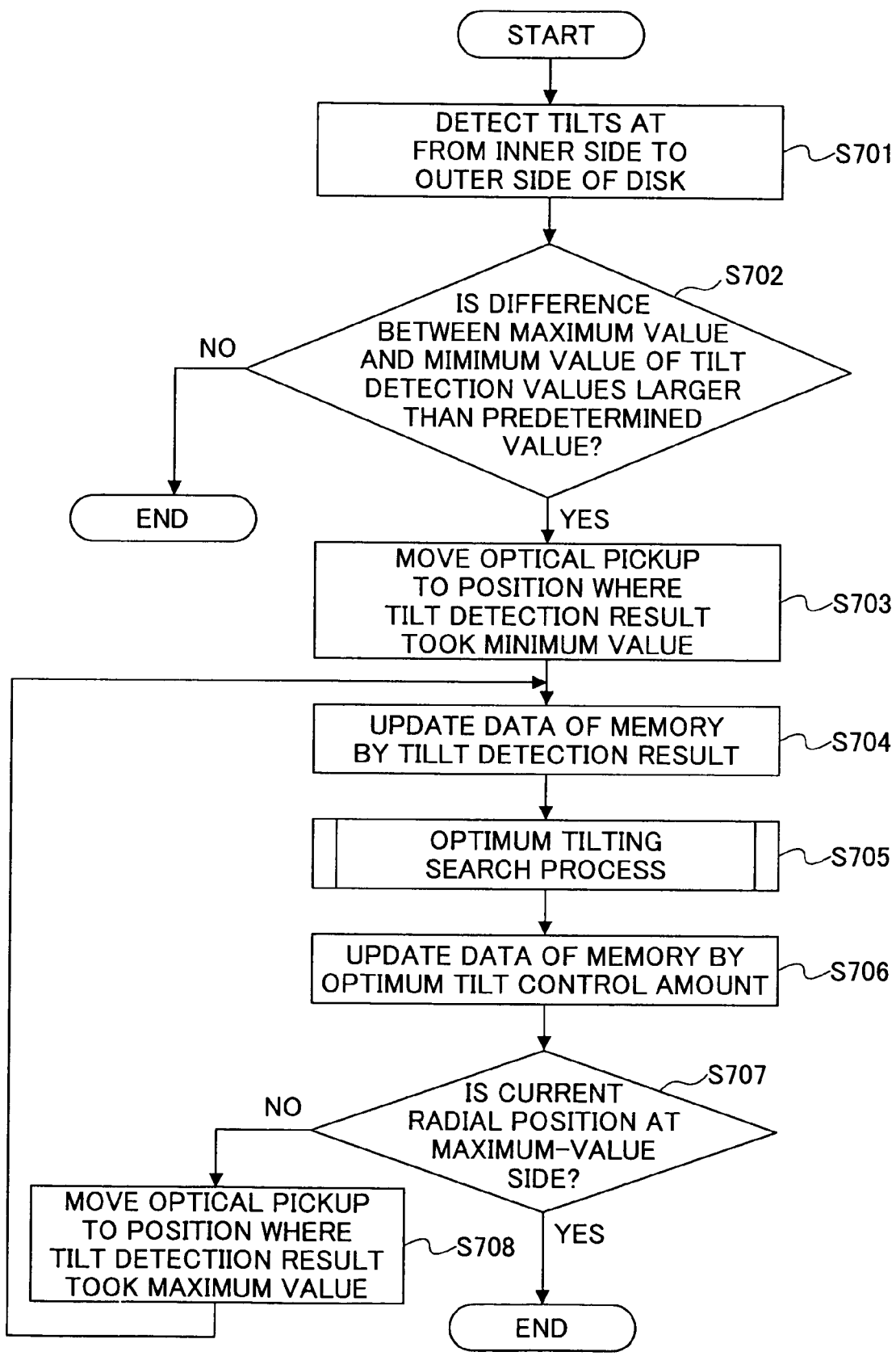
FIG. 13 is a flowchart showing a process of adjusting an offset change and a sensitivity change caused by the time lapse in the case where tilt adjustment is performed by using an optical disk in which the warping of the optical disk changes from the inner side to the outer side of the optical disk.

According to the sixth embodiment, after the same adjustment as in the fifth embodiment is performed, the offset change and the sensitivity change caused by the time lapse is canceled. FIG. 13 shows the flow of this operation. When the optical disk 1 is attached to the spindle motor, the tilt amounts are detected from the inner side to the outer side of the optical disk 1 at Step S701. When the difference between the maximum value and the minimum value out of the detected tilt amounts is larger than a predetermined value (Yes in Step S702), the optical pickup 5 is moved to the radial position where the tilt detection value took the minimum value at Step S703, the tilt value A1 and the control value B1 are obtained, and the values A1 and B1 are updated at Steps S704 to S706.

Meanwhile, when the difference between the maximum value and the minimum value of the detected tilt amount is equal to or smaller than the predetermined value, the procedure proceeds to the normal recording or reproducing.

When the predetermined value is small, the error becomes large, so that the tilt amount is set to be a value larger than 0.3 degree.

At Step S706, the optical pickup 5 is positioned where the tilt amount took the minimum value (No at Step S707). Accordingly, the optical pickup 5 is moved to the position where the tilt amount took the maximum value at Step S708, the tilt value A2 and the control value B2 are obtained, the values A2 and B2 are updated at Steps S704 to S706, and the constant k'' and the value X0' are calculated as in the manner described in the fifth embodiment.

In this example, the values A1, A2, B1 and B2 stored in the memory 24 are updated. However, alternatively, the values k'' and X0' stored in the memory 24 may be updated.

As described above, according to the sixth embodiment, even if the offset and the sensitivity changes after the time lapses, the values k'' and X0' are calculated based on the changed offset and sensitivity. Accordingly, it is possible to perform the accurate tilt adjustment.

The above-described embodiments are only examples of the preferred embodiment of the present invention, and the present invention is not limited to the above-described embodiments.

For example, in the case of performing the tilt adjustment by using an optical disk in which the warping amount changes from the inner side to the outer side of the optical disk, the tilt detection amount and the control value corresponding to the position where the tilt detection amount took the largest value may be first calculated. Thus, various modifications of embodiments of the present invention can be made.

As understood from the above description, according to the present invention, it is possible to provide an optical disk device and a tilt control amount adjustment method by which the accurate tilt adjustment can be performed without being affected by the zero point displacement and sensitivity scattering of the tilt detection means, the zero point displacement and sensitivity scattering of the objective lens inclining means, the offset/gain scattering of the circuit, and the changes of these values.

This patent application is based on Japanese priority patent application Nos. 2002-274117 and 2003-141204 filed on Sep. 19, 2002 and May 19, 2003, respectively the entire contents of which are hereby incorporated by reference.

What is claimed is:

1. An optical disk device comprising:
   an optical pickup that records information on an optical disk or reproduces information from the optical disk, the optical disk being attached to the optical disk device;
   a tilt sensor that is provided on the optical pickup and detects inclination of the optical disk in terms of a radial direction of the optical disk;
   a tilt detection circuit that detects an output of the tilt sensor;
   an objective lens that is provided on the optical pickup and focuses laser light on the optical disk;
   tilt driving means for inclining the objective lens in terms of the radial direction by an amount corresponding to a driving signal;
   a tilt driving circuit that applies the driving signal to the tilt driving means based on a control signal;
   tilt control means for providing the control signal to the tilt driving circuit based on an output of the tilt detection circuit;
   reference tilt value storing means for storing a reference output of the tilt detection circuit as a reference tilt value, the reference output of the tilt detection circuit being based on a reference optical disk having a warping amount equal to or smaller than a predetermined value;
   reference control value storing means for storing as a reference control value a reference control signal corresponding to a reference driving inclining amount in which inclining the objective lens by the reference driving inclining amount minimizes or reduces inclination of the objective lens relative to the reference optical disk;
   wherein the tilt control means is adapted to provide the control signal to the tilt driving circuit, wherein the control signal is determined by multiplying a difference between the output of the tilt detection circuit and the reference tilt value by a predetermined control constant, and adding the reference control value to the multiplied difference.

2. The optical disk device according to claim 1, wherein to the tilt driving circuit, the tilt control means provide $Y=k \times (X-X0)+Y0$ as the control signal, X being the output of the tilt detection circuit, X0 being the reference tilt value, Y0 being the reference control value, k being the predetermined control constant.

3. The optical disk device according to claim 1, wherein to obtain the reference driving inclining amount, tilt driving means incline the objective lens N number of times by respective different inclining amounts, and the tilt control means calculates an expected highest reproducing signal level based on N number of data points that include the respective inclining amounts and respective reproducing signal levels generated by the different inclining amounts, the expected highest reproducing signal level being determined as the reference driving inclining amount.

4. The optical disk device according to claim 1, further comprising:
   adjustment tilt value storing means for storing as a second reference tilt value a second reference output of the tilt detection circuit being based on a second reference optical disk having a warping amount larger than the predetermined value; and
   adjustment control value storing means for storing as a second reference control value a second reference control signal corresponding to the second reference driving inclining amount in which inclining the objective lens by the second reference driving inclining amount minimizes or reduces inclination of the objective lens relative to the second reference optical disk,
   wherein the predetermined control constant is determined based on a difference between the second reference tilt value and the reference tilt value, and a difference between the second reference control value and the reference control value.

5. The optical disk device according to claim 4, wherein the control constant is: $k=(B-Y0)/(A-X0)$ where A is the second reference tilt value, and B is the second reference control value.

6. The optical disk device according to claim 4, wherein if the output of the tilt detection circuit is larger than a predetermined value when attaching the optical disk, the output of the tilt detection circuit is stored as a new second reference tilt value in the adjustment tilt value storing means, the adjustment control value storing means store as a new second reference control value a new second reference control signal corresponding to a new second reference driving inclining amount in which inclining the objective lens by the new second reference driving inclining amount minimizes or reduces inclination of the objective lens relative to the optical disk.

7. The optical disk device according to claim 1, further comprising constant storing means for storing the control constant that is based on a difference between a second reference tilt value and the reference tilt value, and difference between a second reference control value and the reference control value,
   the second reference tilt value corresponding to a second reference output of the tilt detection circuit being based on a second reference optical disk having a warping amount larger than the predetermined value,
   the second reference control value corresponding to a second reference driving inclining amount in which inclining the objective lens by the second reference driving inclining amount minimizes or reduces inclination of the objective lens relative to the second reference optical disk.

8. The optical disk device according to claim 7, wherein if the output of the tilt detection circuit is larger than a predetermined value when attaching the optical disk, the constant storing means store as a new control constant a constant that is determined based on a difference between a new second reference tilt value and the reference tilt value, and a difference between a new second reference control value and the reference control value, the new second reference tilt value corresponding to the output of the tilt detection circuit being based on the optical disk, the new second reference control value corresponding to a new second reference driving inclining amount in which inclining the objective lens by the new second reference driving inclining amount minimizes or reduces inclination of the objective lens relative to the optical disk.

9. An optical disk device comprising:

an optical pickup that writes information on an optical disk, or reproduces information from the optical disk, the optical disk being attached to the optical disk device;

a tilt sensor that is provided on the optical pickup, and detects inclination of the optical disk;

a tilt detection circuit that detects an output of the tilt sensor;

an objective lens that is provided on the optical pickup, and focuses laser light on the optical disk;

tilt driving means for inclining the objective lens by an amount corresponding to a driving signal in terms of a radial direction of the optical disk;

a tilt driving circuit that applies the driving signal to the tilt driving means, based on a control signal; and tilt control means for providing the control signal to the tilt driving circuit, based on an output of the tilt detection circuit, wherein a reference output of the tilt detection circuit is set as a reference tilt detection value, the reference output being based on an inner side radial position of a reference optical disk having a warping amount that changes from the inner side radial position to an outer side radial position of the reference optical disk a reference control signal is set as a reference control value, the reference control signal corresponding to a reference driving inclining amount in which inclining the objective lens by the reference driving inclining amount minimizes or reduces inclination of the objective lens relative to the reference optical disk at the inner side radial position, a second reference output of the tilt detection circuit is set as a second reference tilt detection value, the second reference output being based on the outer side radial position of the reference optical disk, a second reference control signal is set as a second reference control value, the second reference control signal corresponding to a second reference driving inclining amount in which inclining the objective lens by the second reference driving inclining amount minimizes or reduces inclination of the objective lens relative to the reference optical disk at the outer side radial position, the optical disk device further comprises tilt relation storing means for storing the reference tilt value, the second reference tilt value, the reference control value and the second reference control value, or storing constants that represent relation between the output of the tilt detection circuit and the control signal, the constants being calculated based on the reference tilt value, the second reference tilt value, the reference control value and the second reference control value, and the tilt control means calculate the control signal based on the output of the tilt detection circuit by using the information stored in the tilt relation storing means.

10. The optical disk device according to claim 9, wherein the tilt control signal has information of Y:

$Y = k'' \times X + X0'$, where $k'' = (B2-B1)/(A2-A1)$, and $X0' = (-A1 \times B2 + A2 \times B1)/(A2-A1)$, A1 is the reference tilt value, A2 is the second reference tilt value, B1 is the reference control value, and B2 is the second reference control value.

11. The optical disk device according to claim 9, wherein when a change of the output of the tilt detection circuit from an inner side radial position to an outer side radial position of the optical disk is larger than a predetermined value, a new reference output of the tilt detection circuit is set as a new reference tilt detection value, the new reference output being based on a reference radial position on the optical disk where the new reference output is small, a new reference control signal is set as a new reference control value, the new reference control signal corresponding to a new reference driving inclining amount in which inclining the objective lens by the new reference driving inclining amount minimizes or reduces inclination of the objective lens relative to the optical disk at the reference radial position, a new second reference output of the tilt detection circuit is set as a new second reference tilt detection value, the new second reference output being based on a second reference radial position on the optical disk where the new second reference output is large, a new second reference control signal is set as a new second reference control value, the new second reference control signal corresponding to a new second reference driving inclining amount in which inclining the objective lens by the new second reference driving inclining amount minimizes or reduces inclination of the objective lens relative to the optical disk at the second reference radial position, and the tilt relation storing means store the new reference tilt value, the new second reference tilt value, the new reference control value, and the new second reference control value, or store new constants that represent relation between the output of the tilt detection circuit and the control signal, the new constants being calculated based on the new reference tilt value, the new second reference tilt value, the new reference control value, and the new second reference control value.

12. A method of performing tilt adjustment of an objective lens relative to an optical disk, comprising the steps of:

attaching to an optical disk device a reference optical disk in which a warping amount of the reference optical disk is equal to or smaller than a predetermined value;

detecting a reference inclination amount of the reference optical disk in terms of a radial direction of the reference optical disk;

obtaining a reference driving inclining amount in which inclining the objective lens by the reference driving inclining amount minimizes or reduces inclination of the objective lens relative to the reference optical disk;

storing the reference inclination amount as a reference tilt value, and storing the reference driving inclining amount as a reference control value;

removing the reference optical disk from and attaching an object optical disk to the optical disk device;

detecting an object inclination amount of the object optical disk;

determining a target inclining amount based on the reference tilt value, the reference control value, and the object inclination amount; and inclining the objective lens by the target inclining amount to perform tilt adjustment of the objective lens relative to the object optical disk.

13. The method according to claim 12, wherein the step of obtaining the reference driving inclining amount comprises the steps of:
(a) inclining the objective lens by a predetermined inclining amount;
(b) detecting a reproducing signal level generated by the optical pickup in a state where the objective lens is inclined by the predetermined inclining amount;
(c) repeating the steps (a) and (b) N number of times to obtain the N number of data points, wherein the predetermined inclining amounts of the respective N number of times of the step (a) are different from each other;
(d) determining an expected highest reproducing signal level based on the N number of data points; and
(e) determining the expected highest signal level as the reference driving inclining amount.

14. The method according to claim 13, wherein the step of obtaining the reference driving inclining amount further comprises the steps of:
determining a quadratic curve that approximately represents relation between the predetermined inclining amount and the reproducing signal level, based on the N number of data points; and
determining the expected highest signal level based on the determined quadratic curve.

15. The method according to claim 12, further comprising the steps of:
attaching to the optical disk device a second reference optical disk in which a warping amount of the second reference optical disk is larger than the predetermined value;
detecting a second reference inclination amount of the second reference optical disk in terms of a radial direction of the second reference optical disk;
obtaining a second reference driving inclining amount in which inclining the objective lens by the second reference driving inclining amount minimizes or reduces inclination of the objective lens relative to the second reference optical disk;
storing the second reference inclination amount as a second reference tilt value, and the second reference driving inclining amount as a second reference control value; and
determining the target inclining amount further based on the second reference tilt value and the second reference control value.

16. The method according to claim 12, further comprising the steps of:
attaching to the optical disk device, a second reference optical disk in which a warping amount of the second reference optical disk is larger than the predetermined value;
detecting a second inclination amount of the objective lens in terms of a radial direction of the second reference optical disk;
obtaining a second reference driving inclining amount in which inclining the objective lens by the second reference driving inclining amount minimizes or reduces inclination of the objective lens relative to the second reference optical disk;
calculating a control constant based on a difference between the second reference inclination amount and the reference tilt value, and a difference between the second reference driving inclining amount and the reference control value; and
determining the target inclining amount by using the determined control constant.

17. The method according to claim 16, wherein the step of obtaining the second reference driving inclining amount comprises the steps of:
(a) inclining the objective lens by a predetermined inclining amount;
(b) detecting a reproducing signal level generated by an optical pickup in a state where the objective lens is inclined by the predetermined inclining amount;
(c) repeating the steps (a) and (b) N number of times to obtain N number of data points, wherein the predetermined inclining amounts of the respective N number of times of the step (a) are different from each other;
(d) determining an expected highest reproducing signal level based on the N number of data points; and
(e) determining the expected highest signal level as the second reference driving inclining amount.

18. The method according to claim 17, wherein the step of obtaining the second reference driving inclining amount further comprises the steps of:
determining a quadratic curve that approximately represents relation between the predetermined inclining amount and the reproducing signal level, based on the N number of data points; and
determining the expected highest signal level based on the determined quadratic curve.

19. A method of performing tilt adjustment of an objective lens relative to an optical disk, comprising the steps of:
attaching to an optical disk device a reference optical disk in which a warping amount of the reference optical disk changes from an inner side to an outer side of the reference optical disk;
detecting a reference inclination amount of the reference optical disk at the inner side in terms of a radial direction of the reference optical disk;
obtaining a reference driving inclining amount in which inclining the objective lens by the reference driving inclining amount minimizes or reduces inclination of the objective lens relative to the reference optical disk at the inner side;
detecting a second reference inclination amount of the reference optical disk at the outer side in terms of the radial direction of the reference optical disk;
obtaining a second reference driving inclining amount in which inclining the objective lens by the second reference driving inclining amount minimizes or reduces inclination of the objective lens relative to the reference optical disk at the outer side;
removing the reference optical disk from and attaching an object optical disk to the optical disk device;
detecting an object inclination amount of the object optical disk;
determining a target inclining amount based on the object inclination amount, the reference inclination amount, the second reference inclination amount, the reference driving inclining amount, and the second reference driving inclining amount; and
inclining the objective lens by the target inclining amount to perform tilt adjustment of the objective lens relative to the object optical disk.

20. The method according to claim 19, wherein the target inclining amount is Y:

$$Y=k''\times X+X0',$$

where $k''=(B2-B1)/(A2-A1)$, and $X0'=(-A1 \times B2 + A2 \times B1)/(A2-A1)$, A1 is the reference inclination amount, A2 is the second reference inclination amount, B1 is the reference driving inclining amount, B2 is the second reference driving inclining amount, and X is the object inclination amount.

21. The method according to claim 20, further comprising the step of storing the values k" and X0' in a memory.

22. An optical disk device, comprising:
an optical pickup that records information on an optical disk or reproduces information from the optical disk;
a tilt sensor that detects inclination of the optical disk in terms of a radial direction of the optical disk;
an objective lens supported by the optical pickup to perform said information recording and reproducing;
a tilt adjustment mechanism for inclining the objective lens in terms of the radial direction based a driving signal;
a tilt driving circuit that applies the driving signal to the tilt adjustment mechanism based on a control signal;
a tilt detection circuit that generates a tilt detection result based on the inclination detected by the tilt sensor, wherein the tilt detection result constitutes a reference tilt value when the optical disk is a reference optical disk having a warping amount equal to or smaller than a predetermined value, and wherein the tilt detection result constitutes an object inclination amount when the optical disk is an object optical disk;
a memory that stores the reference tilt value;
a CPU for providing the control signal to the tilt driving circuit, wherein the control signal for adjusting relative inclination between the objective lens and the object optical disk is determined by:

$$Y = k \times (X - X0)$$

wherein Y is the control signal, X is the object inclination amount, X0 is the reference tilt value, and k is a predetermined control constant.

23. The optical disk according to claim 22, wherein the memory stores as a reference control value a reference control signal corresponding to a reference driving inclining amount in which inclining the objective lens by the reference driving inclining amount minimizes or reduces inclination of the objective lens relative to the reference optical disk, and wherein the control signal for adjusting relative inclination between the objective lens and the object optical disk is modified according to:

$$Y = k \times (X - X0) + Y0$$

wherein Y0 is the reference control value.

24. The optical disk device according to claim 23, wherein the tilt sensor and the objective lens are separately provided on the optical pickup such that the inclination of the optical disk detected by the tilt sensor is not affected by inclining the objective lens.

25. The optical disk device according to claim 23, further comprising a spindle motor that rotates the optical disk, wherein when the tilt sensor detects the inclination of the optical disk, the spindle motor rotates the optical disk.

26. An optical disk device, comprising:
an optical pickup that records information on an optical disk or reproduces information from the optical disk;
a tilt sensor that is provided on the optical pickup and detects inclination of the optical disk in terms of a radial direction of the optical disk;
a tilt detection circuit that detects an output of the tilt sensor;
an objective lens that is provided on the optical pickup for information recording or reproducing;
tilt driving means for inclining the objective lens in terms of the radial direction, based on a driving signal;
a tilt driving circuit that applies the driving signal to the tilt driving means based on a control signal;
tilt control means for providing the control signal to the tilt driving circuit based on an output of the tilt detection circuit;
reference tilt value storing means for storing a reference output of the tilt detection circuit as a reference tilt value, the reference output of the tilt detection circuit being based on a reference optical disk having a warping amount equal to or smaller than a predetermined value;
reference control value storing means for storing as a reference control value a reference control signal corresponding to a reference driving inclining amount in which inclining the objective lens by the reference driving inclining amount reduces inclination of the objective lens relative to the reference optical disk;
wherein the tilt control means is adapted to determine, for adjusting inclination of the objective lens relative to an object optical disk, a target inclining amount by which the objective lens may be tilted relative to the object optical disk, and wherein the target inclining amount is based on the reference tilt value, the reference control value, and an object output of the tilt detection circuit corresponding to the object optical disk.

* * * * *